United States Patent [19]

Honnen et al.

[11] 3,951,614

[45] *Apr. 20, 1976

[54] FUEL DETERGENTS

[75] Inventors: Lewis R. Honnen, Petaluma; Marvin D. Coon, Vallejo, both of Calif.

[73] Assignee: Chevron Research Company, San Francisco, Calif.

[ * ] Notice: The portion of the term of this patent subsequent to Jan. 5, 1991, has been disclaimed.

[22] Filed: Mar. 15, 1973

[21] Appl. No.: 341,650

Related U.S. Application Data

[63] Continuation-in-part of Ser. No. 256,289, May 24, 1972, Pat. No. 3,785,789.

[52] U.S. Cl. .......................................... 44/58; 44/63; 44/66; 44/70; 44/71; 44/72
[51] Int. Cl.$^2$ ........................................... C10L 1/22
[58] Field of Search .............. 44/66, 71, 72, 62, 63, 44/58; 252/50; 260/404.5, 583 P, 561 R, 453 AR, 453 AL, 520

[56] References Cited
UNITED STATES PATENTS

| | | |
|---|---|---|
| 3,442,630 | 5/1969 | Annable et al. .......................... 44/66 |
| 3,600,413 | 8/1971 | Grimm ..................................... 44/72 |
| 3,624,115 | 11/1971 | Otto et al. ................................ 44/72 |
| 3,746,520 | 7/1973 | Mehmedbasich ....................... 44/72 |
| 3,752,657 | 8/1973 | Richardson et al. .................... 44/72 |
| 3,756,793 | 9/1973 | Robinson ................................. 44/72 |
| 3,785,789 | 1/1974 | Honnen et al. ......................... 252/50 |

*Primary Examiner*—Floyd D. Higel
*Assistant Examiner*—Mrs. Y. Harris-Smith
*Attorney, Agent, or Firm*—G. F. Magdeburger; C. J. Tonkin; J. Tedd Brooks

[57] ABSTRACT

The reaction products of hydrocarbyl-substituted amines with certain polyfunctional coupling agents, find use as detergents in distillate fuel compositions. The hydrocarbyl group is normally derived from natural sources or polyolefins of from about 420 to 10,000 average molecular weight. The polyfunctional coupling agents are certain polyhalides, polycarboxylic acids, and organic polyisocyanates.

9 Claims, No Drawings

FUEL DETERGENTS

CROSS-REFERENCE TO RELATED APPLICATIONS

The present application is a continuation-in-part of copending application Ser. No. 256,289, filed May 24, 1972, now U.S. Pat. No. 3,785,789.

BACKGROUND OF THE INVENTION

1. Field of the Invention

Deposits tend to build up in the carburetor throttle body and fuel-intake systems of modern internal combustion engines. The problem becomes critical in automobiles that frequently operate under idling conditions in heavy traffic, such as taxi fleets, delivery fleets, and the like. However, these deposits can be found in heavy amounts in virtually all services, including normal passenger car service. Common results of intake system deposits are carburetor malfunction, poor intake valve seating, heavy manifold deposits, and restricted breathing. Detergents are included in distillate fuels to maintain carburetor cleanliness and to exert an extended detergent action over the entire intake system. It is extremely difficult to obtain a satisfactory detergent which is effective in the various areas and under the different conditions in which deposits occur in the internal combustion engine. These problems are made more difficult to solve by the low concentrations in which detergents are used in fuels.

2. Description of the Prior Art

Several recent patents have disclosed the usefulness of high molecular weight hydrocarbyl polyamines as effective detergent/dispersants in lubricating oil compositions and fuels, U.S. Pat. Nos. 3,438,757; 3,574,576; and 3,565,804.

SUMMARY OF THE INVENTION

The complex reaction products of certain high molecular N-hydrocarbyl amines with selected coupling agents which are polyfunctional low molecular weight carboxylic acids, acid halides, anhydrides, polyisocyanates, or polyhalides, can function as detergents in hydrocarbonaceous liquid fuels for internal combustion engines. The hydrocarbyl substituents have average molecular weights in the range of about 420 to 10,000. The hydrocarbyl radical will normally be derived from mineral oils of relatively high molecular weight, or polyolefins, by halogenation of the hydrocarbon and displacement of a halogen with an appropriate polyamine. The coupling agents of value in the practice of this invention are normally telechelic, relatively low molecular weight, aliphatic or aromatic polyfunctional molecules such as certain organic polyhalides, polycarboxylic acids, and organic polyisocyanates which are reactive towards the amine. Depending on the coupling agent chosen, the product is a complex amide, imide, polyamide, higher order amine, N-hydrocarbylurea, polyurea, or other complex condensation product.

DETAILED DESCRIPTION OF THE INVENTION

The compositions of this invention are the complex reaction products of certain high molecular weight N-hydrocarbyl amines with selected coupling agents which are aliphatic or aromatic polyfunctional low molecular weight carboxylic acids, acid halides, anhydrides, isocyanates or halides. Of course, the products of the coupling reactions are normally of higher average molecular weight than the hydrocarbyl amine reactants, since they normally consist of the condensation product of two hydrocarbyl amines through the coupling agent by reaction at a primary or secondary amino nitrogen of the amine. Considering the complexity of the amine reactants themselves, the several possible sites of reaction in polyamines, and the possibility of coupling two, three or more amines, it is difficult to obtain a practical structural description of the product. Hence, the products are characterized by the following descriptions of the reactants and reaction conditions.

HYDROCARBYL-SUBSTITUTED POLYAMINES

The hydrocarbyl-substituted amine reactants of this invention are high molecular weight hydrocarbyl N-substituted amines. Hydrocarbyl, as used herein, denotes an organic radical composed solely of carbon and hydrogen, except for minor, insubstantial, sometimes adventitious amounts of other elements such as chlorine and oxygen. The hydrocarbyl group may be aliphatic, alicyclic, or aromatic, or combinations thereof, e.g., aralkyl. Preferably, the hydrocarbyl groups will be relatively free of aliphatic unsaturation, i.e., ethylenic and acetylenic, particularly acetylenic unsaturation. The hydrocarbyl substituents will have average molecular weights in the range of about 420 to 10,000, more usually in the range of about 750 to about 6,000. When the hydrocarbyl groups are of lower molecular weight, the average number of hydrocarbyl substitutes in the amine can be greater than one. The hydrocarbyl will preferably be aliphatic, having from 0 to 2 sites of unsaturation, more usually 0 to 2 sites of ethylenic unsaturation and preferably from 0 to 1 site of ethylenic unsaturation.

The hydrocarbyl group is preferably derived from a polyolefin, itself derived from olefins of from 2 to 6 carbon atoms (ethylene being copolymerized with an olefin of at least 3 carbon atoms), or from a high molecular weight petroleum-derived hydrocarbon. Polyisobutylene is the most preferred source of the hydrocarbyl group.

Illustrative sources for the high molecular weight hydrocarbons from petroleum mineral oils are naphthenic bright stocks. For the polyolefin, illustrative polymers include polypropylene, polyisobutylene, poly-1-butene, copolymers of ethylene and propylene, poly-1-pentene, poly-4-methyl-1-pentene, poly-1-hexene, poly-3-methylbutene-1, etc.

The hydrocarbyl amines are derived from amines, preferably alkylene polyamines and polyalkylene polyamines by, for example, the reaction of a halogenated hydrocarbon with the amine. Examples of such amines include piperazine, ethylenediamine, 2-aminoethyl piperazine, diethylene triamine, di(trimethylene)triamine, dipropylene triamine, triethylene tetramine, tripropylene tetramine, tetraethylene pentamine, pentaethylene hexamine, ethylene dipiperazine, methylamine and ammonia. The amines encompass isomers, such as branched-chain polyamines, and substituted and alkyl-substituted amines, e.g., N-methyl ethylene diamine, N,N'-dimethyl ethylene diamine, N,N-diamino propane, N-hydroxyethyl ethylene diamine, etc. Amines having up to about 12 amino nitrogens and up to about 20 carbon atoms are especially preferred. The hydrocarbyl amines are prepared, in general, by the reaction of halogenated hydrocarbons with the amine. Details of such preparation and further descriptions of certain hydrocarbyl amines and methods of preparing them can be found in U.S. Pat. Nos. 3,565,804 and 3,671,511.

The hydrocarbyl substituents in a hydrocarbyl polyamine can be found at any nitrogen atoms which is capable of receiving it. These nitrogen atoms are, in general, inequivalent by symmetry. In general, the substituted polyamines which find use in the present invention are mixtures of mono- and poly-substituted polyamines with hydrocarbyl groups substituted at various equivalent and inequivalent nitrogen atoms. The reaction which yields the complex products of the present invention can occur at any nitrogen which is capable of reacting with the coupling agent. Consequently, it would be both impractical and confusing to try to express the complex reaction products in terms of a single general formula or class of formulas.

In preparing the hydrocarbyl-substituted polyamine reactants, rarely will a single compound be employed. With both the polymers and the petroleum-derived hydrocarbyl groups, the composition is a mixture of materials having various structures and molecular weights. Therefore, in referring to molecular weight, average molecular weights are intended. Furthermore, when speaking of a particular hydrocarbyl group, it is intended that the group include the mixture that is normally contained with materials which are commercially available; that is, polyisobutylene is known to have a range of molecular weights, and may also include very small amounts of very high molecular weight materials. Furthermore, depending on the method of preparation, the end group of the polymer may vary and may be terminated not only with an isobutene group, but with a 1- or 2-butene group.

The polyamines which are commercially available are frequently mixtures of various polyamines and branched-chain isomers, having 1 or 2 species dominating. Thus, in commercially available tetraethylene pentamine, there will also be small amounts of pentaethylene hexamine and triethylene tetramine. In referring to tetraethylene pentamine, for example, it is intended not only to include the pure compound, but those mixtures which are obtained with commercially available alkylene polyamines. Finally, as indicated, in preparing the compounds of this invention, where the various nitrogen atoms of the polyamine are not equivalent, the product will be a mixture of the various possible isomers, and the coupling of the hydrocarbyl-substituted polyamines can produce a variety of possible final structures.

COUPLING AGENTS

The coupling agents which function to yield detergents of the present invention upon reaction with the high molecular weight hydrocarbyl-substituted amines are normally telechelic (terminally reactive) polyfunctional molecules of relatively low molecular weight and are preferably difunctional. They may be classified among several general groups of polyfunctionalities. These functionalities are chemical groupings distinguished by their ability to react with primary or secondary amino nitrogen atoms in a hydrocarbyl-substituted amine to yield products in which the coupling agent is bound to said amino nitrogen by a chemical bond.

Both structure and molecular weight are important considerations with respect to the performance of hydrocarbyl-substituted amines as gasoline additives. Average molecular weights are increased by the reaction of hydrocarbyl-substituted amines with polyfunctional compounds. Reactions with telechelic polyfunctional compounds of the present invention indicate that average molecular weights are, in general, doubled, indicating dimerization. Since the molecular weight of the coupling compounds are small compared to that of the hydrocarbyl-substituted amines, the nitrogen contents are essentially unchanged on a weight basis.

Dimerization also alters the chemical nature of the amino nitrogen. The product of the reaction of polybutene ethylene diamine with 1,4-dichloro-2-butene is expected to have properties which differ from that of polybutene ethylene diamine, in that all the amino nitrogens are allylic instead of only one in the starting polybutene ethylene diamine. Similarly, the use of p-bis(chloromethyl)benzene as the coupling agent gives a product containing both benzylic and allylic amines. On the other hand, the use of acid halides, or acid anhydrides, converts the amines into amides with lower total basicity, as well as higher molecular weight.

1. By polycarboxylic acid is intended those acids, acid halides, anyhydrides, or their equivalents, which react with primary or secondary amino nitrogen to yield amides and polyamides, or react with primary amino nitrogen to form imides. These polycarboxylic acids, both aromatic and aliphatic, are satisfactory coupling agents in the present invention. Examples of such polycarboxylic acids include oxalic, malonic, succinic, glutaric, adipic, pimelic, azelaic, sebacic and other saturated $\alpha,\omega$-dicarboxylic acids of relatively low molecular weight, and the substituted acids of the same name. The aliphatic $\alpha,\omega$-dicarboxylic acids are useful telechelic coupling agents and include, in addition to those already named, tartaric, maleic, glutaconic, malic, tartronic, fumaric acids, and so forth. Unsaturated polycarboxylic acids such as maleic, fumaric, and itaconic are useful coupling agents, as are the substituted polycarboxylic acids such as tartronic, malic, tartaric, nitrile triacetic, and citric acids. Coupling agents include aromatic polycarboxylic acids and equivalents such as phthalic anhydride, terephthaloyl chloride, and preferably, pyromellitic dianhydride. The polycarboxylic coupling agents are aliphatic or aromatic telechelic compounds, characterized by molecular weights below about 300, and carbon numbers in the range from $C_2$ to about $C_{20}$.

2. Organic polyisocyanates, such as toluene diisocyanate, react with primary or secondary amino nitrogen to yield hydrocarbyl-ureas which are satisfactory fuel detergents. Examples of such organic polyisocyanates include phenylene diisocyanates, such as toluene diisocyanate, methylene diisocyanates, such as methylenediphenyldiisocyanate, alkylated methylenephenyldiisocyanate, hexamethylenediisocyanate, and polymeric isocyanates, such as polymethylenepolyphenylisocyanate, or those derived from the reaction of polyisocyanates in the polyols or polyamines. The organic polyisocyanate coupling agents are aliphatic or aromatic telechelic compounds, characterized by molecular weights below about 400 and carbon numbers in the range from about 2 to about 20.

3. Organic polyhalides which find use within the scope of this invention are low molecular weight aliphatic or aromatic telechelic polyhalides, preferably dihalides, e.g., dichloroalkanes, dichloroalkenes, and dichloroalkyl benzenes, such as 1,4-dichloro-2-butene, or p-bis-(chloromethyl)benzene. The halides are generally of from 4 to about 20 carbon atoms, preferably in which the halogens are attached to different carbon atoms and preferably are separated by several carbon atoms. The organic dihalides react with primary or secondary amino nitrogen to yield higher order amines. They are the preferred coupling agent of the invention because of their effectiveness in deposit control.

4. Coupling compounds containing 2 or more different functionalities of the above types are not excluded, but are included under one or the other species of coupling agents, e.g., a halide-substituted acid or isocyanate such as p-chlorophenylisocyanate.

METHOD OF PREPARATION

The coupling agents are illustrated by the known, commercially available, chemicals previously discussed. The method of preparation of the hydrocarbyl amines has been described and illustrated with numerous examples in U.S. Pat. Nos. 3,565,804, 3,574,576 and 3,438,757, which are herein incorporated by reference. The products of this invention are prepared by reacting a coupling agent with a hydrocarbyl amine by directly mixing the reactants, or solubilizing in a mutual solvent such as benzene, xylene, or hexane. In general, the mole ratio of the reactants can range from 1:3 to 3:1. Normally, the reactions proceed by contacting the reagents, with stirring, at temperatures from about 25°C. to about 250°C. for from 1 to 48 hours. The organic product is usually washed, the aqueous phase removed, and the product is stripped of solvent. Infrared spectra were taken routinely to check the product. Molecular weight measurements indicate the products correspond to the coupling of two hydrocarbyl amines. For purposes of illustration, the products obtained in the following examples were largely "dimeric" as shown by molecular weight determinations.

EXAMPLE 1

Polyisobutenyl ethylene diamine (500 g., about 0.3 mole), wherein the polybutenyl is of average molecular weight 1,400, was heated to 115°C, and 1,4-dichloro-2-butene (21.9 g., 0.175 mole) was added in one step. The temperature was increased to 190°C. for 20 minutes, then lowered to 150°C. and held for 3.5 hours. The temperature was then increased to 210°C. over a 35-minute period. The mixture was cooled, diluted with 1 liter of mixed hexanes, 800 ml. of methanol and 500 ml. of dilute NaOH. The resulting mixture was heated to boiling and poured into a separatory funnel. The aqueous layer was removed and the organic layer washed with 500 ml. of boiling water. The mixture was concentrated by distillation with final stripping carried out on the solvent stripper at 100°C. for 1.5 hours to obtain 456 g. of dimerized material with the following analysis: molecular weight, 2,530: percent nitrogen, 1.34.

EXAMPLE 2

Polyisobutenyl tetraethylene pentamine (464 g., about 0.3 mole) wherein the polybutenyl is of average molecular weight 950, was heated to 80°C., followed by the one-step addition of 20.4 g. (0.16 mole) of 1,4-dichloro-2-butene. The temperature was increased to 145°C. and held for one hour and twenty minutes. Upon cooling, 600 ml. of mixed hexanes, 600 ml. of isopropyl alcohol, and 300 ml. of water containing 15 g. of NaOH was added. The aqueous layer was removed and 150 ml. more water added, followed by shaking. The aqueous layer was removed. Final washing was carried out with 300 ml. of water. The organic layer was concentrated by distillation, with final stripping to yield 465 g. of dimer: molecular weight 2,550: percent nitrogen, 4.33.

EXAMPLE 3

Polyisobutenyl ethylene diamine of Example 1 (100 g., about 0.06 mole) was heated to 120°C. p-bis(-chloromethyl)benzene was added in one step and the temperature increased to 160°C. and held for 3 hours and 15 minutes. The mixture was diluted with hexane and isopropyl alcohol, washed with dilute NaOH and water, and stripped to yield 95 g. of dimer: molecular weight 2,700: percent nitrogen 1.48; IR 1680 cm$^{-1}$.

EXAMPLE 4

Polyisobutenyl amine (206 g., about 0.25 mole), wherein the polyisobutenyl amine is of average molecular weight 820, was heated to 110°C. and 1,4-dichloro-2-butene (12.8 g., about 0.1 mole) was added in one step. The mixture was heated for about seven hours with the temperature rising to 133°C. The mixture was cooled, diluted with mixed hexanes, washed with dilute sodium hydroxide, then washed with water until washings were neutral. Solvent was removed from the mixture by stripping on the solvent stripper at 100°C. for several hours to give 183.2 g. of partially dimerized material having the following analysis: molecular weight, 1290; percent nitrogen, 1.48.

EXAMPLE 5

25 ml. of pyridine and the polyisobutenyl ethylene diamine of Example 1 (100 g.) were dissolved in 50 ml. of benzene and heated to reflux. Pyromellitic dianhydride (6.1 g., about 0.03 mole) and 40 ml. of hot pyridine were added drop-wise over a ten-minute period. A completely homogeneous solution resulted. Heating at reflux was continued for 1 hour and 15 minutes, then solvent was removed by distillation until the temperature reached 180°C. The mixture was cooled to 150°C. and held for 3 hours, then cooled to room temperature and 100 ml. of toluene and 25 ml. of n-butanol were added. The mixture was washed three times in 100 ml. portions of water containing 5 percent n-butanol, then concentrated by distillation with final stripping yielding 99 g. of product; molecular weight 3,550; percent nitrogen 1.54; IR, 1635 cm$^{-1}$ (amide), and 1725 cm$^{-1}$ (imide); base number of product, 19 mg. KOH/g; base number of starting material, 53 mg. KOH/g; acid number of product, 6.1 mg. KOH/g.

EXAMPLE 6

Terephthaloyl chloride (5.7 g., about 0.03 mole) and the polyisobutenyl ethylene diamine of Example 1 (100 g.) were dissolved in 100 ml. of benzene and heated to reflux for 20 minutes. Solvent was removed at distillation until the temperature reached 150°C. This temperature was held for 3.5 hours, followed by work-up as in Example 3 giving 94 g. of material: molecular weight 3,380; percent nitrogen 1.53; IR, 3,320 cm$^{-1}$ (NH), 1650 cm$^{-1}$ (amide); base number of starting material 53 mg. KOH/g; base number of product 23 mg. KOH/g; acid number of product 1.8 mg. KOH/g.

EXAMPLE 7

Polyisobutenyl ethylene diamine of Example 1 (672 g.) was added to 150 ml. of toluene and 86.4 g. of diphenolic acid dissolved in 300 ml. of tetrahydrofuran. The mixture was stirred at 150°C. for 12 hours under nitrogen. The product was stripped to 325°F. and weighed 753 g.

EXAMPLE 8

19.2 g. of trimellitic anhydride was mixed with the polyisobutenyl ethylene diamine of Example 1 (672 g.) in 125 ml. of tetrahydrofuran. The mixture was stirred for 12 hours at about 163°C. under nitrogen. The product was stripped to 335°F. and weighed 696 g.

EXAMPLE 9

Oleyl amine (52.6 g., about 0.2 mole) in 150 ml. of xylene was heated to 100°C. and 1,4-dichloro-2-butene (11.1 g., about 0.09 mole) was added in one step. Heating was continued for two and one-half hours at which time the temperature had increased to 141°C. The mixture was cooled, washed with dilute sodium hydroxide, then washed with water until the washings were neutral. The mixture was stripped on the solvent stripper to give 46.5 g. of material having the following analysis: molecular weight, 700; percent nitrogen, 4.48; percent chlorine, 1.64.

EXAMPLE 10

Ethylene diamine tetra-acetic acid (29.2 g.) was mixed with the polyisobutenyl ethylene diamine of Example 1 (896 g.) and 100 ml. of toluene. The mixture was stirred at 325°–335°F. for 6 hours under a nitrogen atmosphere. About 6–7 cc of $H_2O$ was collected in a Start trap and the product was stripped of toluene under reduced pressure.

EXAMPLE 11

Itaconic acid (26 g.) was mixed with polyisobutenyl ethylene diamine (808 g.) and 150 cc. of toluene. The mixture was stirred at 325°–335°F. for 12 hours under nitrogen atmosphere. The toluene was removed under reduced pressure.

EXAMPLE 12

Epichlorohydrin (28 g.) was mixed with polyisobutenyl ethylene diamine of Example 1 (672 g.) and the mixture was stirred at 230°–235°F. for 15 hours. The mixture was stripped to 325°F. under vacuum.

EXAMPLE 13

Polyisobutenyl ethylene diamine of Example 1 (900 g.) was mixed with 900 g. of a neutral oil and stirred at 200°F. for 15 minutes. 43.5 g. of toluene 2,4-diisocyanate was then added and the mixture stirred at 295°–320°F. for 8 hours. The product was stripped, dissolved in hexane and filtered. The hexane was removed under reduced pressure.

EXAMPLE 14

Fumaric acid (7.78 g.) was mixed with an approximately equimolar amount of the polyisobutenyl ethylene diamine of Example 1 (100 g.) in 600 ml. of xylene. $N_2$ was flushed during the reaction which occurred at xylene reflux temperature for 6 hours. 1.2 ml. of water was collected overhead. 500 ml. of methyl alcohol and 100 ml. of $H_2O$ were added to the reaction product and the polymer layer separated from the aqueous layer. The hexane solubles were azeotroped with benzene to remove excess water and the solvents were stripped under vacuum. Molecular weight about 2,380; percent nitrogen, 1.37.

EXAMPLE 15

Maleic anhydride (5.4 g.) was mixed with 100 g. of the polyisobutenyl ethylene diamine of Example 1 in 600 ml. of xylene. The reaction mixture was flushed with $N_2$ and the reaction occurred at the xylene reflux temperature for 6 hours. About 1 ml. of water was collected as a reaction product. The product was separated with ethanol-water several times, azeotroped with benzene and stripped under vacuum. Molecular weight about 2.997; percent nitrogen, 1.33.

EXAMPLE 16 d-tartaric acid (20 g.) was mixed with 100 g. of the polyisobutenyl ethylene diamine of Example 1 in 600 ml. of xylene. The system was flushed with nitrogen and reacted at xylene reflux temperature for 6 hours. About 5.9 ml. of water was collected as a reaction product. The polymer product was separated by adding about 500 ml. of ethanol (95 percent) and 100 ml. of water, boiling the mixture, and removing the non-aqueous layer. This was repeated. The polymer product was then azeotroped with benzene to remove the last traces of water and the product was stripped under vacuum. Molecular weight about 2,980; percent nitrogen, 1.34.

COMPOSITIONS

Depending on the particular application of the composition of this invention, the reaction may be carried out in the medium in which it will ultimately find use and be formed in concentrations which provide a concentrate of the detergent composition. Thus, the final mixture may be in a form to be used directly upon dilution in fuels. The detergent will generally be employed in a hydrocarbonaceous liquid fuel boiling in the gasoline and diesel oil ranges, i.e., generally having an ASTM D-86, 90 percent point below about 700°F. and above about 200°F. and include fuels boiling in the range of from about 100°F. to about 750°F. The detergent may be formulated as a concentrate, using a suitable hydrocarbon solvent. Preferably, an aromatic hydrocarbon solvent is used, such as benzene, toluene, xylene or higher boiling aromatics or aromatic thinners. Aliphatic alcohols of about 3 to 8 carbon atoms, such as isopropanol isobutanol, n-butanol and the like, in combination with hydrocarbon solvents are also suitable for use with the detergent additive.

In the fuel, the concentration of the detergent will generally be at least 100 p.p.m. and usually not more than 4,000 p.p.m., more usually in the range of from about 200 to about 800 p.p.m. In concentrates, the detergent will generally be from 1 to 50 weight percent, more usually from about 5 to 30 weight percent, and will generally not exceed 80 percent by weight.

In gasoline fuels, other fuel additives may also be included such as anti-knock agents, e.g., tetramethyl lead, tetraethyl lead. Also included may be lead scavengers such as aryl halides, e.g., dichlorobenzene or alkyl halides, e.g., ethylene dibromide. A non-volatile lubricating mineral oil, e.g., petroleum spray oil, particularly a refined naphthenic lubricating oil having a viscosity at 100°F. of 1,000 to 2,000 SUS, is a suitable additive for the gasoline compositions used with the detergents of this invention and its use is preferred. Similar hydrocarbon oils, such as propylene oils, can also be used. These oils are believed to act as a carrier for the detergent and assist in removing and preventing deposits. They are employed in amounts of from about 0.05 to 0.5 percent by volume, based on the final gasoline composition.

EVALUATION

To demonstrate the effectiveness of the compositions of this invention as detergents, a number of fuel compositions were tested in a single-cylinder engine having a compression ratio of 9:1, a bore of 3.25 inches, a stroke of 4.5 inches and the displacement of 37.22 cubic inches. To the fuel were added 1,000 p.p.m. of a carrier oil (naphthenic oil of 1,740 SUS at 100°F.) containing sufficient detergent to give a concentration of 250 p.p.m. detergent in the fuel. The duration of the test was 12 hours, at 1,800 rpm, a jacket temperature of 212°F., and engine manifold vacuum of 15-inch Hg, intake temperature of 95°F., air/fuel ratio of 14 and ignition spark timing 15° BTC. After the test, the engine was disassembled and the deposits on the intake valve were weighed after washing with hexane. The results were as follows:

TABLE II

| Composition | Coupling Agent | Hexane Washed Valve Deposits in Mg |
| --- | --- | --- |
| 1 | 1,4-dichloro-2-butene | 18 |
| 2 | 1,4-dichloro-2-butene | 12 |
| 3 | p-bis(chloromethyl)benzene | 12 |
| 4 | 1,4-dichloro-2-butene | 11 |
| 5 | pyromellitic dianhydride | 30 |
| 6 | terephthaloyl chloride | 15 |
| 9 | 1,4-dichloro-2-butene | 437 |
| Reference | No additive | 76 |

In Table II, the numbered compositions refer to the numbered examples previously given. The reference fuel also contained 1,000 p.p.m. of the carrier oil. The data graphically demonstrate the utility and superiority of the compositions of this invention. Excellent fuel detergent results are obtained, which in most cases are superior to those obtained from well-known and widely used detergent additives. It can be seen that the dimerized structures made from fairly low molecular weight amines, e.g., oleylamine, Example 9, have very poor intake valve performance, while the higher molecular weight polybutenyl amine products of Examples 1, 2 and 4, with the same coupling agent, give a very small amount of deposit.

The additives of this invention are able to function in both lubricating oils and fuels. Moreover, they are readily available by simple synthetic methods and they provide detergency without producing ash.

As will be evident to those skilled in the art, various modifications of this invention can be made or followed in the light of the foregoing disclosure and discussion, without departing from the spirit or scope of the disclosure or from the scope of the following claims.

We claim:
1. A fuel composition comprising a major amount of a hydrocarbonaceous liquid fuel and, in an amount sufficient to provide detergency, a composition which is the reaction product of a hydrocarbyl-substituted amine, wherein said hydrocarbyl substituent is of from about 420 to about 10,000 average molecular weight, with an aliphatic or aromatic coupling agent of from 2 to about 20 carbon atoms, selected from the group consisting of polycarboxylic acid, polyisocyanates and polyhalides, in a mole ratio of from about 1:3 to about 3:1 at from 25° to about 250°C for from 1 to 48 hours wherein said polycarboxylic acid is a telechelic compound having a molecular weight below about 300; said polyisocyanate is a telechelic compound having a molecular weight below about 400, and said polyhalide contains from about 4 to 20 carbon atoms.

2. A fuel composition according to claim 1, wherein the hydrocarbyl-substituted amine is an alkylene polyamine of from 2 to 12 nitrogen atoms.

3. A fuel composition according to claim 2, wherein said alkylene polyamine is selected from the group consisting of ethylene diamine, diethylene triamine, triethylene tetramine, and tetraethylene pentamine.

4. A fuel composition according to claim 1, wherein said hydrocarbyl substituent is of from about 750 to 6,000 average molecular weight.

5. A fuel composition according to claim 4, wherein said hydrocarbyl substituent is derived from polyisobutylene or polypropylene.

6. A fuel composition according to claim 1, wherein said coupling agent is a telechelic dihalide selected from the group consisting of dichloroalkanes, dichloroalkenes, and dichloroalkylbenzenes.

7. A fuel composition according to claim 1, wherein said coupling agent is a telechelic diisocyanate selected from the group consisting of phenylene diisocyanates and methylene diisocyanates.

8. A fuel composition according to claim 1, wherein said coupling agent is a telechelic aliphatic $\alpha,\omega$-dicarboxylic acid.

9. A fuel composition according to claim 1, wherein said coupling agent is an aromatic polycarboxylic acid selected from the group consisting of phthalic anhydride, terephthaloyl chloride, and pyromellitic dianhydride.

\* \* \* \* \*